Dec. 6, 1966 D. W. TAYLOR ETAL 3,289,963

TAPE CARTRIDGE

Filed April 19, 1965 2 Sheets-Sheet 1

INVENTORS.
DAVID W. TAYLOR
RICHARD T. HOBSON
ROBERT B. GRAHAM

BY Dennison & Dennison
ATTORNEYS.

TAPE CARTRIDGE

Filed April 19, 1965 2 Sheets-Sheet 2

INVENTORS
DAVID W. TAYLOR
RICHARD T. HOBSON
ROBERT B. GRAHAM

BY Dennison & Dennison
ATTORNEYS.

United States Patent Office 3,289,963
Patented Dec. 6, 1966

3,289,963
TAPE CARTRIDGE

David W. Taylor, Valley Forge, Richard T. Hobson, Newton Square, and Robert B. Graham, Broomal, Pa., assignors, by mesne assignments, to Transportation Musitime, Inc., Upper Darby, Pa., a corporation of Delaware Filed Apr. 19, 1965, Ser. No. 449,146
12 Claims. (Cl. 242—55.19)

This invention relates to new and useful improvements in tape cartridges and more particularly to means for positively engaging the tape therein against a driven capstan.

Magnetic tape, wire, and the like are now widely used for recording of sound and other data. It has been the practice for several years to provide such tape in the form of cartridges or other unitary components containing a single reel or a plurality of reels so that the tape may be employed in recording and playback apparatus without removal of the tape or magnetic material from the unit. Both double and single reel devices have met with success and commercial acceptance. The invention set forth in the instant application, although adaptable to both types of reels is exemplified herein as applied to a cartridge employing but a single reel wherein a single elongated loop of magnetic tape is wound about the central hub from the outside and is paid off for withdrawal from the center of the reel.

Such tape cartridges as described are shown clearly in the patents to Eash Nos. 2,778,637 and 2,778,880 issued January 22, 1957.

In the prior art cartridges and those issued subsequent thereto, rather complicated mechanisms have been employed to engage the tape firmly against the drive capstan or wheel in order to transport the tape past the transducer head.

According to the present invention, the cartridge is provided with means to positively engage the tape against the driven capstan for tape transport, which means is considerably simplified and less complicated than the prior art devices for accomplishing the same result.

It is an object of the present invention to provide a cartridge for magnetic tape and the like having means integral therewith to positively engage the tape against the periphery of a drive capstan of a recorder-reproducer.

It is a further object of this invention to provide a relatively low cost cartridge for magnetic tape and the like which has integral means for capstan wheel engagement and is readily adaptable to all forms of cartridge-accepting reproducers.

Another important object of this invention is to provide a spring clip capstan engaging means which can be applied within a conventional tape cartridge.

Other objects of the invention are to provide a cartridge for magnetic tape and the like bearing the above objects in mind which is of simple construction, has a minimum number of parts, is relatively inexpensive to manufacture, and is at all times efficient and reliable in use.

For yet other objects and for a better understanding of the invention, reference may be had to the following detailed description taken in conjunction with the accompanying drawings in which.

Reference is now made more specifically to the drawings wherein like numerals designate similar parts throughout the several views and wherein the cartridge for magnetic tape or the like is designated generally at 10.

Figure 1:
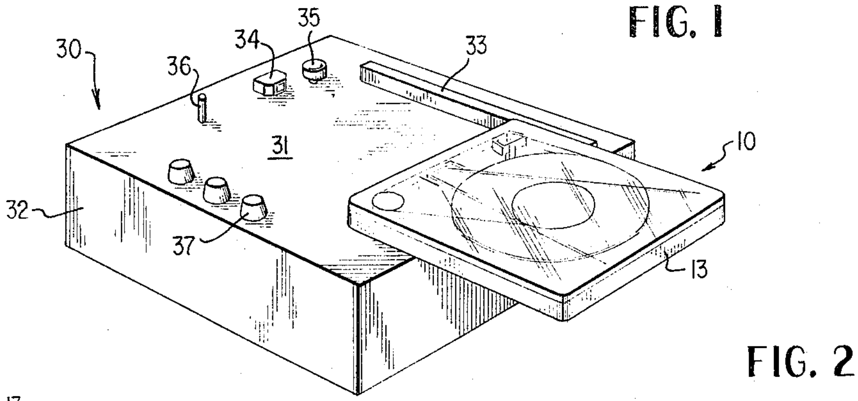
FIGURE 1 is a perspective view of a recorder-reproducer showing the cartridge of the instant invention being placed thereon.

This cartridge is formed for use on recording and playback equipment for the recording of voices, music, or other data, or alternatively to reproduce such sounds or data which have been previously recorded, as will be readily understood by those in this art.

Cartridge 10 in the preferred form of the invention takes the form of a generally rectangular housing of relatively shallow depth and having at least an upper covering 11 formed of transparent plastic or the like. The cartridge has a spaced bottom panel 12 with which are integrally formed side walls 13 disposed at right angles to the bottom panel and cover extending completely around the bottom wall to enclose the same. As will hereinafter be pointed out, cut-out openings are provided in one of the side walls for reception of the recorder-reproducer components.

Both the cover 11 and the bottom panel 12 are imperforate except for a center post 14 extending through both of these members and an aperture 15 in the bottom panel for reception of the drive capstan. Retaining screws 16 are provided through the cover 11 engageable with upstanding post 17 in the base panel 12 for retaining the cover in position on the cartridge.

Figure 3:
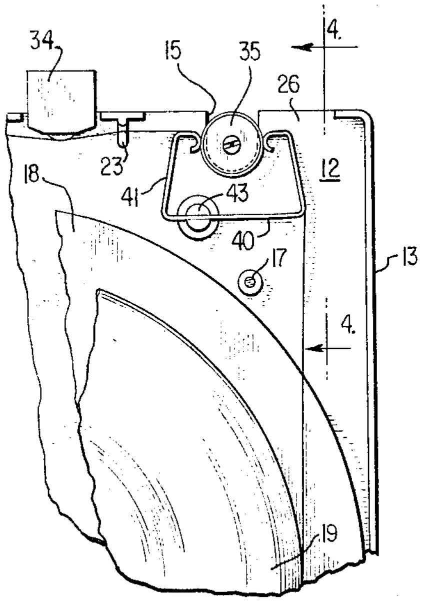
FIGURE 3 is a fragmentary top plan view of the upper right-hand portion of FIGURE 2 showing the cartridge in engagement with the recorder-reproducer components.
Figure 4:
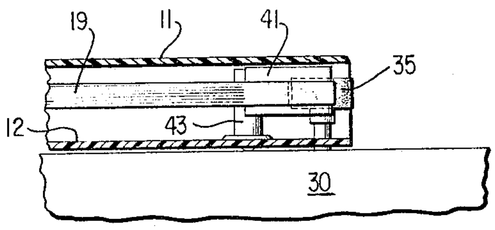
FIGURE 4 is a vertical sectional view taken along the line 4—4 of FIGURE 3.
Figure 5:
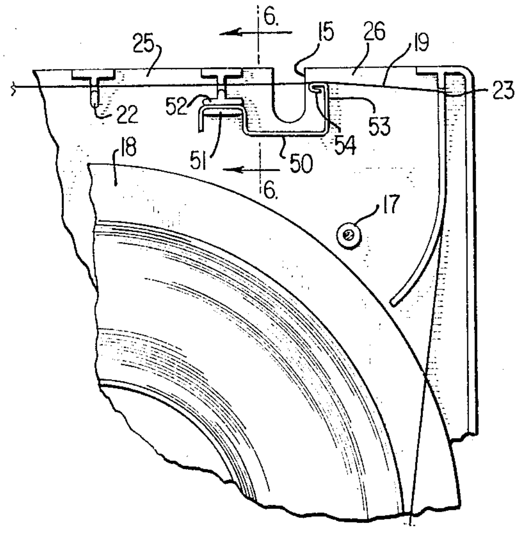
FIGURE 5 is a top plan view similar to FIGURE 3, but showing a modified form of capstan engaging means.
Figure 6:
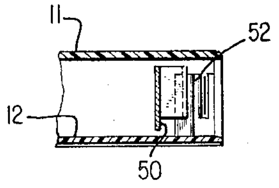
FIGURE 6 is a vertical sectional view taken along line 6—6 of FIGURE 5.

A rotatable tape disk 18 having an integral centrally disposed hub rests on a washer, not shown, rotatable about the post 14. The disk and component parts are preferably formed of plastic and the magnetic tape 19 is formed in an endless spiral coil and rests on the disk 18. The tape passes from the center portion of reel 18 over a guide rod 20 so that it is spaced slightly from the upper edges of the coiled tape on the reel and will pass freely from the inner surface of the reel. The tape then passes about a guideroller or post 21 mounted adjacent the front side of the cartridge. Additional guide means 22 and 23 may be provided on the base panel 12 for guiding the tape in the area of its contact with the transducer of the reproducing machine. The tape may continue and pass about further guide means 23 shown in the embodiment of FIGURE 5 or may be guided about the means for engaging the tape about the capstan as shown in FIGURE 3 and later described in detail. The tape will then pass to the outside of the spiral tape mounted on the disk 18 as shown in FIGURE 5.

In order to eliminate static electricity generated by the relative movement of adjacent tape convolutions when the cartridge is in use, graphite rods or the like may be provided extending radially on the tape disk 18.

Figure 2:
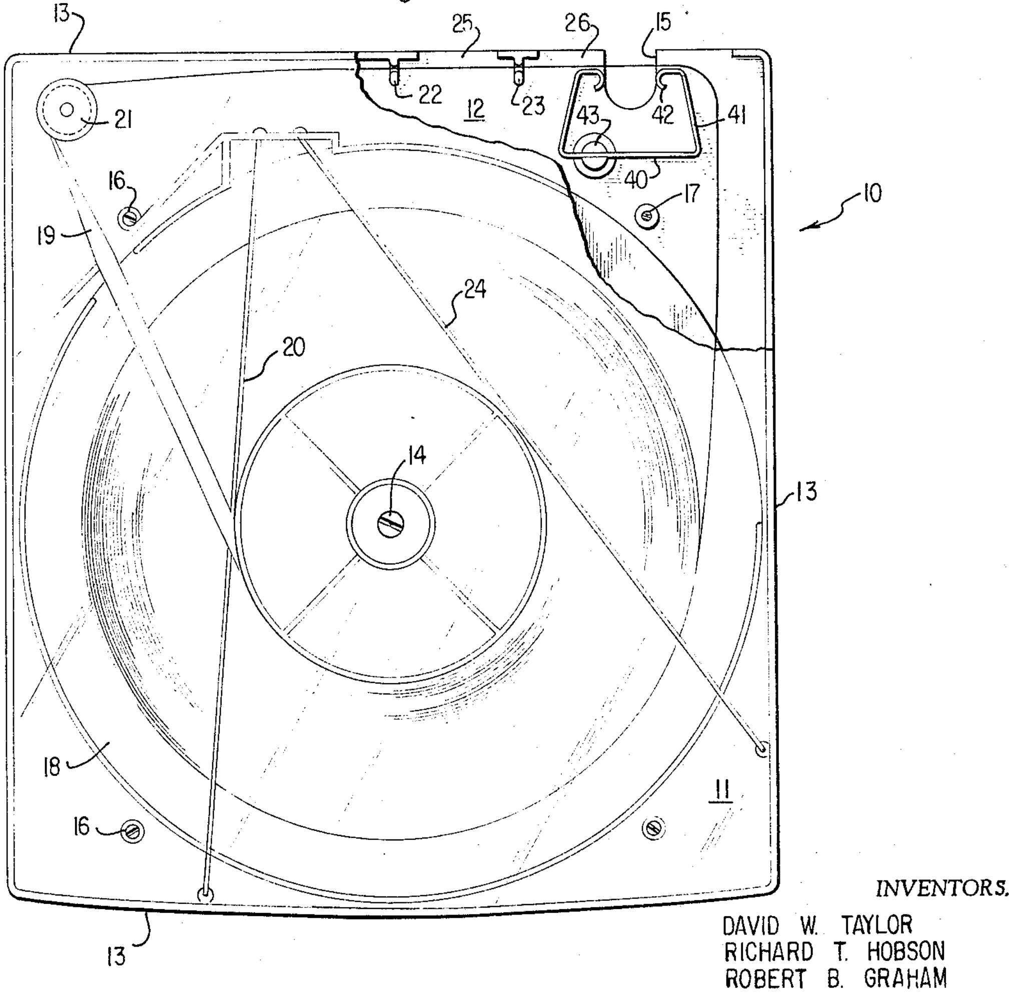
FIGURE 2 is a top plan view of the cartridge of the present invention with a portion of the cover broken away to show the details of the capstan engaging means.

An additional guide rod 24 is provided to retain the tape convolutions in neatly stacked spiral relationship as shown in FIGURE 2.

As is clearly evident from a study of FIGURE 2, two openings 25 and 26 are provided in the front side wall for reception of the recorder-reproducer components.

If desired, brake means may be provided to restrain the tape reel from movement when the reel is not in use. Such means are clearly disclosed in the aforementioned Eash Patent No. 2,778,880.

The recording-playback instrument, particularly designed to accommodate the cartridge above described is indicated generally at 30 and includes a top panel 31 attached to a generally rectangular box 32. Conventional recording electronic circuitry is provided within the box 32 and normally includes preamplifier and amplifier means which may be connected to either an internal or external loudspeaker system. A guide flange 33 is mounted on the upper panel 31 of the instrument and acts to provide an elongated guide strip which one side of the cartridge 10 is adapted to abut.

A conventional recorder-head or transducer 34 is mounted on the panel 31 and a drive capstan 25 is mounted adjacent thereto. The drive capstan comprises a rotating cylinder driven by a suitable constant speed electric motor. A rubber or other frictional material surface is provided on the capstan for safely and positively engaging the magnetic tape to be driven. The transducer-head 34 is adapted to be received within the opening 25 of the front side wall of the cartridge and the capstan 35 is adapted to be received within opening 26 and extend upwardly within cut-out 15 provided in the base member 12 of the cartridge. A stop pin 36 may be provided substantially in alignment with the transducer-head and the drive capstan, against which the front edge of the cartridge may abut in order to correctly position the same with regard to the operating components. Conventional control knobs 37 are provided on the top panel 31 for use in a known manner.

The preferred embodiment of the instant invention is clearly shown in FIGURES 1, 2, and 3 and comprises a spring clip 40 having inwardly converging arms 41, the ends of which are rounded as at 42. The clip is self centering and is slideably received in a slot formed in an upstanding pin 43 attached to the base panel 12 of the cartridge. As shown in FIGURE 1, the tape run 19 extends across the front of the open arm portion of the spring clip. Upon insertion of the cartridge in the recorder, the capstan 35 will enter opening 26 and due to the cut-out 15, the same will engage the tape 19 and place the same into the opening formed between the rounded ends of 42 of the spring clip. The tape and capstan will engage against a portion of each of the arms 41 and effectively force the same apart. The spring tension in the arms 41 will serve to hold the tape tightly against the face of the capstan, and it will be noted that the tape engages about at least one-third of the periphery of the capstan. Since there is more than just tangential contact with the drive capstan as is conventional in the prior art, there is less likelihood of slippage and reproduction of music or the like through the transducer head is of higher fidelity. One advantage of the instant capstan engaging means is the fact that even after the capstan has worn to some degree, tape speed will remain constant due to the spring resilient engagement of the tape with a portion of the capstan periphery.

A modification of the invention is shown in FIGURE 5 wherein the spring clip forming the invention is shown at 50. Clip 50 has an extension which is received between two upright support members 51 and 52 conventionally found in endless tape cartridges of the type shown in the previously mentioned Eash patents. In the case of the modification, a spring arm 53 is bent at right angles to the main portion of the clip 50 and has a rounded edge 54 adjacent the opening 15 in the base member 12, which is adapted to engage against tape 19 and the drive capstan 35.

It should be recognized that various arrangements of the spring clip may be provided in the tape cartridge of the instant invention. For example, it may be feasible to provide the spring clip arrangement shown in FIGURE 3 on the upstream side of the transducer opening 25. Further, the spring clip arrangement could be used in a double spool type of cartridge exemplified in U.S. Patent No. 2,804,508, issued to Mastling et al. on August 27, 1957.

While we have shown and described a preferred embodiment and one modification of the invention, it is to be understood that the drawings and detailed disclosure are to be construed in an illustrative rather than a limiting sense since various modifications and substitutions of equivalents may be made by those skilled in the art wherein the spirit and scope of the invention is as defined in the appended claims.

What we claim as new and desire to protect by Letters Patent of the United States is:

1. A cartridge for magnetic tape adapted for use with a recording play-back instrument having a rotatable drive capstan and a transducer head arranged in proximity to each other, said cartridge comprising a housing closed on all sides except for openings to receive said capstan and said tranducer head, a supply of tape within said housing, means to guide said tape linearly across said openings, resilient non-rotatable capstan engaging means comprising a spring clip mounted in said housing adjacent said capstan opening and behind said linear tape portion, said capstan engaging means adapted to resiliently hold said tape in contact with a portion of the periphery of said capstan when the cartridge is placed in position on said instrument.

2. A cartridge for magnetic tape as set forth in claim 1, wherein said capstan engaging means comprises a U-shaped metal clip having resilient side arms and a base portion, said clip being mounted in said cartridge with said side arms straddling the capstan opening, and the ends of said side arms being rounded to serve as tape guides.

3. A cartridge for magnetic tape as set forth in claim 2, and further including a vertical post mounted within said housing, the base portion of said clip being slidably mounted on said post.

4. A cartridge for magnetic tape as set forth in claim 1, wherein said capstan engaging means comprises a generally L-shaped resilient arm, means rigidly securing one end of said arm to the base of said housing, the free end of said arm being located on one side of said capstan opening and having its tip rounded to serve as a tape guide.

5. A cartridge for an endless strip of magnetic tape adapted for use with a recording play-back instrument having a rotatable drive capstan and a transducer head, said cartridge comprising a generally shallow rectangular housing having spaced bottom and top panels and substantially short vertical peripheral side walls, openings in one of said side walls for reception of said capstan and transducer head, a tape reel rotatably mounted in said housing on said bottom panel and having a vertical central hub, an endless spirally coiled roll of tape on said reel about said hub, said roll of tape having a loop projecting therefrom toward said one side wall, one portion of said loop joining with the inner convolution of said roll and another portion of said loop joining with the outer convolution of the roll, guide means in said housing adjacent said one side wall and about which said loop is passed, whereby an intermediate portion of the loop passes across said openings for cooperation with said transducer head and drive capstan when the cartridge is in position on said instrument, and resilient non-rotatable capstan engaging means mounted in said housing adjacent said capstan opening and behind said intermediate portion of the loop, said capstan engaging means adapted to resiliently hold said tape in arcuate contact with a portion of the periphery of said capstan when the cartridge is placed in position on said instrument.

6. A cartridge for magnetic tape as set forth in claim 5, wherein said capstan engaging means comprises a U-shaped metal clip having resilient side arms and a base portion, said clip being mounted on said bottom panel with said arms straddling the capstan opening, and the ends of the side arms being rounded to serve as tape guides.

7. A cartridge for magnetic tape as set forth in claim 6, and further including a vertical post mounted within said housing on said bottom panel, the base portion of said clip being slidably mounted on said post.

8. A cartridge for magnetic tape as set forth in claim 5, wherein said capstan engaging means comprises a generally L-shaped resilient arm, means rigidly securing one end of said arm to the bottom panel of said housing, the free end of said arm being located on one side of said capstan opening and having its tip rounded to serve as a tape guide.

9. A cartridge for magnetic tape adapted for use with a recording play-back instrument having a rotatable drive capstan and a transducer head, said cartridge comprising a housing closed on all sides except for openings on one side to receive said capstan and transducer head, rotatable means in said housing adapted to hold a supply of tape, means in said housing to guide tape linearly across said openings, resilient non-rotatable capstan engaging means comprising a spring clip mounted in said housing adjacent said capstan opening, said capstan engaging means being adapted to resiliently hold tape in contact with a portion of the periphery of said capstan when the cartridge is placed in position on said instrument.

10. A cartridge for magnetic tape as set forth in claim 9, wherein said capstan engaging means comprises a U-shaped metal clip having resilient side arms and a base portion, said clip being mounted in said cartridge with said side arms straddling the capstan opening, and the ends of said arms being rounded to serve as tape guides.

11. A cartridge for magnetic tape as set forth in claim 10, and further including a vertical post mounted within said housing, the base portion of said clip being slidably mounted on said post.

12. A cartridge for magnetic tape as set forth in claim 9, wherein said capstan engaging means comprises a generally L-shaped arm, means rigidly securing one end of said arm to the base of said housing, the free end of said arm being located on one side of said capstan opening and having its tip rounded to serve as a tape guide.

References Cited by the Examiner

UNITED STATES PATENTS 2,778,880 1/1957 Eash -------------- 179—100.2

FOREIGN PATENTS 667,717 7/1963 Canada.

STANLEY N. GILREATH, *Primary Examiner.*

LEONARD D. CHRISTIAN, *Examiner.*